INVENTOR.
Alvin H. Wilkinson

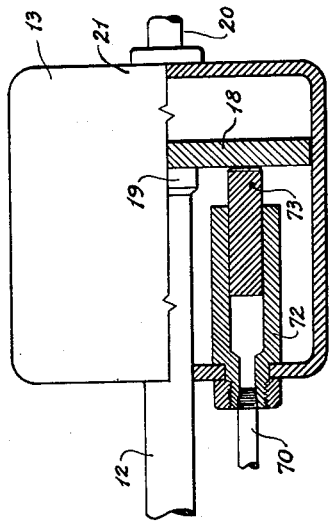
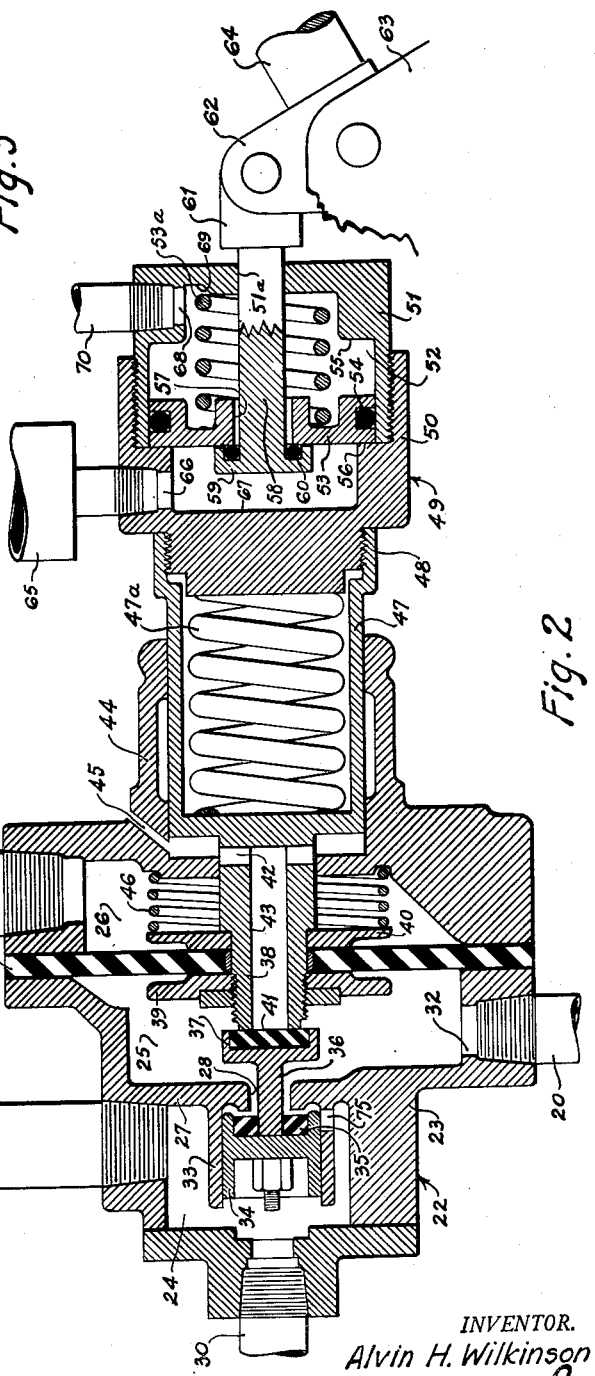

United States Patent Office 2,759,457
Patented Aug. 21, 1956

2,759,457

HYDRAULIC SERVO CONTROL APPARATUS

Alvin H. Wilkinson, Tulsa, Okla., assignor, by mesne assignments, to Cabot Shops, Inc., Boston, Mass., a corporation of Massachusetts Application May 11, 1951, Serial No. 225,776

2 Claims. (Cl. 121—41)

This invention relates to brakes, and more particularly, but not by way of limitation, to a hydraulic control for a pneumatic powered brake or similar apparatus. This application is a continuation-in-part of applicant's co-pending application, Serial Number 112,680 filed August 27, 1949, now Patent No. 2,705,059, and entitled "External Brake."

The present invention contemplates a hydraulic control system for an external brake such as shown in said co-pending application and is particularly concerned with the problem of notifying the operator of the braking action being supplied and providing a more sensitive feed for the brake operator. A novel hydraulic circuit is interconnected to the actuating handle, air valve and air actuator in such manner that the position of the actuating handle notifies the operator of the braking action being applied and positioning of the handle determines the braking action being applied.

An important object of this invention is to provide a hydraulic control for a brake to notify the operator of the braking action being applied.

Another object of this invention is to provide means for assuring the application of a predetermined braking action for each setting of the actuating handle.

A further object of this invention is to provide means for controlling the operation of the air valve of a pneumatic braking apparatus.

An additional object of this invention is to provide a novel hydraulic control system utilizing a movable master cylinder operable by a combination of mechanical and hydraulic forces.

A still further object of this invention is to provide an efficient hydraulic control for a braking apparatus having a long service life and which may be economically manufactured.

Other objects and advantages of the invention will be evident from the following detailed description, read in conjunction with the accompanying drawings, which illustrate my invention.

In the drawings:

Figure 2 is a partial sectional view of the hydraulic control shown in Figure 1.

Figure 3 is a sectional view, partially in elevation, of the air actuator.

Figure 1:
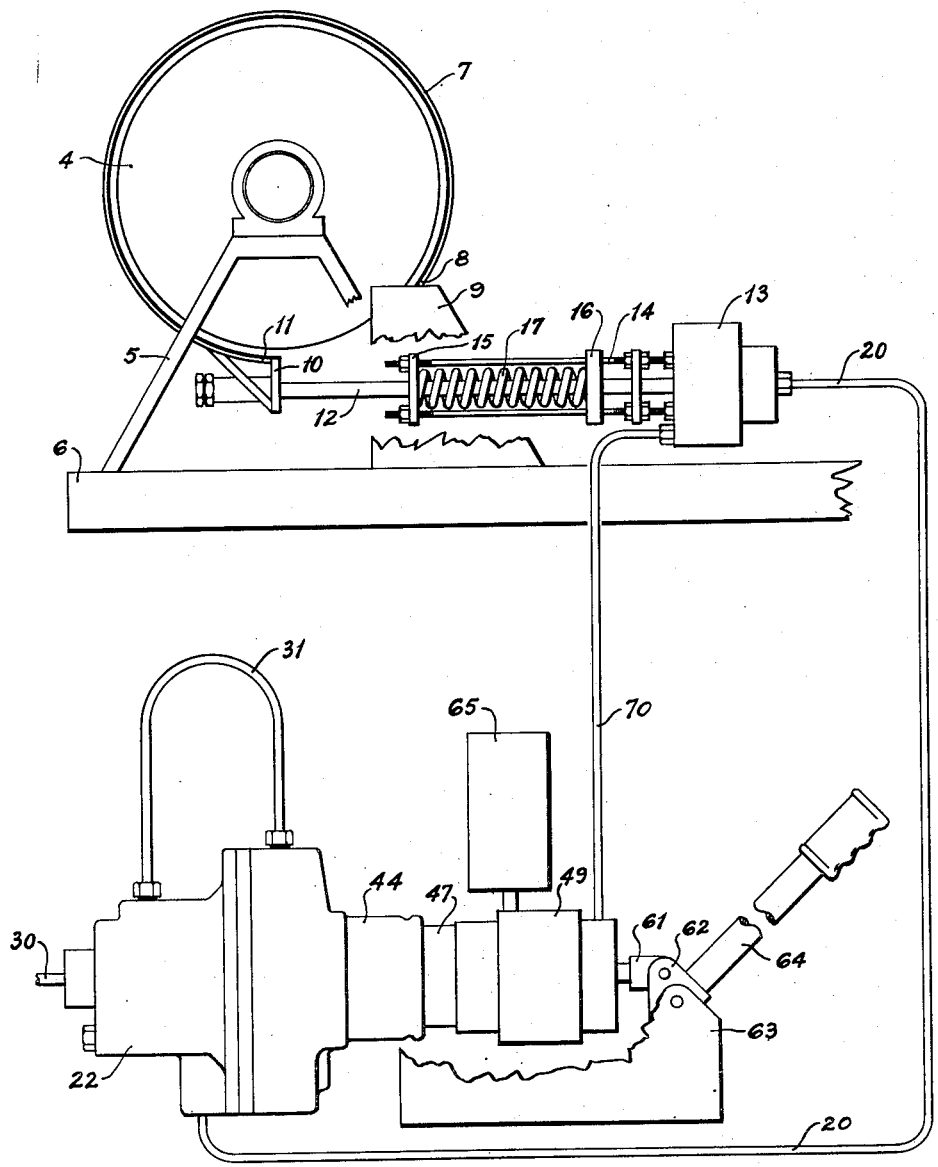
Figure 1 is an elevational view of a braking apparatus having a novel hydraulic control thereon.

Referring to the drawings in detail, and particularly Fig. 1, reference character 4 designates a rotatable drum such as a hoisting drum or the like, rotatably supported by legs 5 on a stationary base 6. A brake band 7 preferably of the type shown in applicant's above-mentioned co-pending application encircles the drum 4. The band 7 is pivotally secured (not shown) at one end 8 thereof to a stationary plate 9 carried by the base portion 6. A suitable bracket 10 is secured to the opposite end 11 of the brake band 7 for connection with a horizontally disposed rod 12. The rod 12 is adapted to be alternately moved to the right and to the left (referring to Fig. 1) to alternately appply and release the brake band 7 on the drum 4 as will be more fully hereinafter set forth.

The rod 12 extends into an air actuating cylinder 13 suitably supported (not shown) on the stationary base 6. A plurality of supoprt rods 14 extend outwardly from the cylinder 13 in parallel relationship to the rod 12 to support an apertured and stationary plate 15 loosely on the rod 12. A second plate 16 is provided with a plurality of apertures (not shown) for receiving the rods 14 and is adapted to move along the rods 14 as will hereinafter set forth. The plate 16 is rigidly secured to the rod 12. A helical spring 17 is provided around the rod 12 between the plates 15 and 16 and is anchored at its opposite ends to the plates 15 and 16. It is readily seen that the spring 17 constantly urges the plate 16 and rod 12 to the right to apply the brake band 7 on the drum 4.

As clearly shown in Fig. 3, a plunger or pressure plate 18 is secured to the outer end 19 of the rod 12 within the air actuating cylinder 13. The plunger 18 is adapted to be moved to the left by air pressure and is moved to the right by the action of the spring 17. A suitable conduit 20 is connected at one end to the rear end 21 of the cylinder 13 and at opposite end to an air valve indicated generally at 22 (Fig. 2).

The air valve 22 comprises a housing 23 having three chambers 24, 25 and 26 therein. A partition 27 having a port or aperture 28 in the central portion thereof separates the chambers 24 and 25. A flexible diaphragm 29 suitably secured in the housing 23 separates the chambers 25 and 26. Air under pressure is constantly supplied to the chamber 24 through a suitable conduit 30 from any desired source (not shown). A by-pass conduit 31 is interconnected to the chamber 24 and the chamber 26, thereby also providing a constant supply of high pressure air to the chamber 26 for purposes as will be hereinafter set forth. The conduit 20 communicates through a threaded aperture 32 with the central chamber 25.

A sleeve or guide 33 is provided on the partition 27 concentrically around the port 28 and extends into the inlet chamber 24 to receive a valve element 34. The valve 34 is adapted to reciprocate in the guide 33 and has a sealing ring 35 on the inner end thereof adapted to close off the port 28 in one position of the valve 34. Furthermore, the valve 34 is secured on a valve stem 36 extending freely through the port 28 and having another valve 37 on the inner end thereof.

A tubular stem 38 extends through the diaphragm 29 and is secured thereto by suitable reinforcing plates 39 and 40 in the usual manner. The stem 38 is adapted to contact the valve 37 and move the valve 34 away from the port 28 as will be hereinafter set forth. A circular shaped piece of sealing material 41 is carried by the valve 37 for sealing off the inner end of the stem 38 as will be hereinafter set forth. A plurality of transverse apertures 42 are provided in the outer end of the stem 38 to establish communication between the central bore 43 of the stem 38 and the interior of a stationary sleeve or guide 44. An exhaust port 45 is provided transversely in the inner end of the sleeve 44 to provide an exhaust of air from the central chamber 25 in one position of the stem 38 as will be hereinafter set forth.

The diaphragm 29 is adapted to reciprocate in the valve housing 23 and is constantly urged into the chamber 25 by a suitable spring 46 co-acting with the valve housing 23 and the reinforcing plate 40. The diaphragm 29 is also constantly urged toward the central chamber 25 by the high pressure air in the chamber 26.

A tubular sleeve 47 is formed on the outer end of the stem 38 and is adapted to reciprocate in the stationary sleeve 44 during operation of the valve 22 as will be hereinafter set forth. The outer end 48 of the tubular sleeve 47 is disposed exteriorly of the stationary sleeve 44 and is internally threaded to receive a master cylinder indicated generally at 49. A spring 47a is disposed in the sleeve 47 and operates as a lock to firmly secure the cylinder 49 in the sleeve 47.

The master cylinder 49 comprises two cup-shaped members 50 and 51 threadedly interconnected as clearly shown in Fig. 2 to form a substantially cylindrical chamber 52. A piston member 53 is reciprocally disposed in the chamber 52 and has a sealing ring 54 in the outer periphery thereof adapted to remain in sealing contact with the inner periphery of the chamber 52. A circumferential shoulder 55 is provided in the cup-shaped member 51 and a circumferential shoulder 56 is provided in the cup-shaped member 50 to provide stops for the piston 53 and limit the reciprocating movement thereof in the chamber 52. An aperture 57 is provided in the central portion of the piston 53 to loosely receive an actuating rod 58. The rod 58 may be moved longitudinally through the aperture 57 as will be hereinafter set forth. A circular shaped head 59 is provided on the inner end of the actuating rod 58 and has a sealing ring 60 therein adapted to contact the piston 53 and seal off the aperture 57 in one position of the rod 58. The head 59 obviously limits the outward movement of the rod 58 independent of the piston 53. A suitable helical spring 53a surrounds the rod 58 and is anchored at its opposite ends to the plunger 53 and cup-shaped member 51 to constantly urge the plunger 53 into contact with the head 59. The rod 58 extends outwardly from the head 59 through an aperture 51a provided in the cup-shaped member 51. A suitable sealing ring (not shown) is preferably provided in the aperture 51a around the rod 58 to preclude leakage of fluid from the chamber 52.

The outer end 61 of the rod 58 is suitably hinged to a triangular-shaped arm 62. The arm 62 is in turn pivotally secured to a stationary bracket 63. An actuating handle 64 is also secured to the arm 62 and in spaced relation to the outer end 61 of the rod 58. It will be apparent that rotative movement of the handle 64 is transmitted through the arm 62 to the rod 58 for actuating the piston 53 and air valve 22 as will be more fully hereinafter set forth.

A hydraulic fluid supply chamber 65 is secured on the cup-shaped member 50 and communicates through a port 66 with the chamber 52. The fluid supply chamber 65 is preferably substantially filled with a suitable hydraulic fluid to maintain a constant supply of hydraulic fluid to the inner end 67 of the chamber 52. A threaded aperture 68 is also provided in the cup-shaped member 51 adjacent the outer end 69 of the chamber 52. One end of a suitable flexible conduit 70 is secured in the aperture 68 and the opposite end thereof is secured to one end of a slave cylinder 72 as clearly shown in Figure 3. The slave cylinder 72 is secured in the air actuator 13 in parallel relationship with the rod 12. A plunger 73 is reciprocally disposed in the slave cylinder 72 and is adapted to protrude from the cylinder 72 into contact with the air actuator plunger 18. A body of hydraulic fluid is retained in the slave cylinder 72, conduit 70 and chamber 52 of the master cylinder 49 to actuate the slave plunger 73 in one direction upon movement of the master plunger 53. The plunger 73 is moved in the opposite direction by the air actuator plunger 18 as will be more fully hereinafter set forth.

Operation

As previously set forth, high pressure air is constantly supplied through the conduit 30 to the outer chamber 24, and through the by-pass conduit 31 into the chamber 26. Assuming the valve 22 is set as shown in Fig. 2, the valve 34 is slightly retracted; therefore, the high pressure air will also flow from the chamber 24 through a transverse port 75, provided in the inner end of the guide 33, and hence through port 28 into the central chamber 25. It will also be noted that the inner end of the stem 38 is in contact with the seal 41 of the valve 37. Therefore, the high pressure air cannot escape through the bore 43 of the stem 38, apertures 42 and exhaust port 45. The high pressure air is constrained to flow from the chamber 25 through the conduit 20 into the end 21 of the air actuator 13 to press the plunger 18 to the left (Fig. 3) against the action of the spring 17 (Fig. 1). The brake band 7 is thereby removed from the drum 4 to release the drum for free rotation. As long as the valve 22 is retained in a position as shown in Fig. 2, a constant supply of high pressure air is directed as above set forth into the air actuator 13 to retain the brake band 7 in a released position.

When it is desired to apply the brake band 7 to the drum 4, the handle 64 is moved slightly in a clockwise direction. The actuating rod 58 is thereby moved to the right and since the head 59 is in contact with the master plunger 53, the master plunger 53 will also be moved to the right. Furthermore, the slave plunger 73 (Fig. 3) is in contact with the air actuating plunger 18. Therefore, the hydraulic fluid cannot be exhausted from the chamber 52 of the master cylinder 49 because of the air pressure against one side of the piston 18 prevents movement thereof until relieved and provides a static fluid lock between the plunger 53 and the master cylinder 49. Hence the cylinder 49 is moved simultaneously to the right with the movement of the rod 58 and plunger 53 to actuate the sleeve 47 and remove the valve stem 38 from the valve 37. In this condition of the air valve 22, communication is established from the central chamber 25 through the bore 43 of the stem 38, the apertures 42, and exhaust port 45 to atmospheric pressure. In addition, the high pressure air in the chamber 24 will force the valve 34 to the right into a closed position over the port 28. Therefore, the air previously supplied to the air actuator 13 is exhausted through conduit 20, chamber 25, passageway 43, apertures 42, and exhaust port 45. The helical spring 17 (Fig. 1) will then operate to force the plate 16 and rod 12 to the right and apply the brake band 7 to the drum 4.

It will also be noted that the chamber 25 will then be at low pressure while the chamber 26 is retained at high pressure. Therefore, the high pressure air in the chamber 26 co-acting with the helical spring 46 will tend to urge the diaphragm 29 and hence the stem 38 to the left. This force is transmitted through the stem 38, sleeve 47 and master cylinder 49 to retain the hydraulic fluid in the chamber 52 to the right of the plunger 53 under pressure, it being understood that the handle 64 and hence the plunger 53 are retained in a fixed position. The pressure exerted on the hydraulic fluid by movement of the sleeve 47 will provide a greater pressure to force the slave plunger 73 to the right to follow the air actuating plunger 18. As the slave plunger 73 moves to the right, whereby the volume between the cylinder chambers 72 and 52 is increased so that the hydraulic fluid is exhausted from the chamber 52 to permit a movement of the master cylinder 49 to the left. It will be apparent that the differential air pressure acting on the diaphragm 29 transmits a force to the sleeve 47, and through the fluid lock in the chamber 52 the force is transmitted to the plunger 53, the rod 58, the arm 62 and to the lever 64. This force transmitted to the lever or handle 64 provides a feel force for the operator in accordance with the application of the brake band 7. When a partial braking action is attained, however, the hydraulic apparatus also positions the valve 22, and is, therefore, in part at least, a control system. If the operation of the apparatus relied only on air pressure, the operator thereof would be unable to determine the amount of braking action applied because air is compressible and the handle 64 could be moved further after full application of the brake.

When the cylinder 49 has reached substantially the position shown in Fig. 2, the stem 38 will again be in contact with the valve head 37 to preclude a further exhaust of air from the air actuator 13 and central chamber 25. In the event the brake band 7 has not been fully applied, the force exerted by the spring 17 will be equalized by the force exerted by the air remaining in the air actuator 13 to retain the plunger 18 in a fixed position and preclude further movement of the slave plunger 73. The hydraulic fluid in the slave cylinder 72, conduit 70 and chamber 52 will again become static to preclude a further movement of the master cylinder 49 to the left and hence an opening of the air valve 22. As long as the actuating handle 64 is retained in this position, the air pressure in the air actuator 13 will remain constant to maintain a predetermined braking action of the brake band 7.

Assuming the handle 64 is again moved in a clockwise direction to the maximum degree, the master cylinder 49 will again be moved to the right through the medium of the hydraulic fluid in the chamber 52 to remove the valve stem 38 from the valve head 37 and permit a further exhaust of air from the air actuator 13. The spring 17 will obviously again move the rod 12 and plunger 18 to the right and fully apply the brake band 7 on the drum 4. Furthermore, the diaphragm 29 will be urged to the left as set forth above to retain the hydraulic fluid present in the chamber 52 and slave cylinder 72 under pressure. The slave plunger 73 will again be moved to the right simultaneously with the air actuating plunger 18 to permit an exhaust of hydraulic fluid from the chamber 52. The master cylinder 49 is then moved to the left in the same manner as set forth above. However, since the brake band 7 is fully applied on the drum 4, the plunger 18 will be moved the maximum extent to the right in the air actuator 13. Therefore, the slave plunger 73 is moved to the right to a greater degree than set for above to permit a greater exhaust of hydraulic fluid from the chamber 52. In this manner, the shoulder 55 in the cup-shaped member 51 will contact the plunger 53 during the movement of the master cylinder 49 to the left to retain the valve stem 38 removed from the valve head 37. Continuous communication is thereby provided between the air actuator 13 and the exhaust port 45 to facilitate the continuous action of the spring 17 in applying the brake band 7.

When it is desired to partially release the brake band 7, the actuating handle 64 is moved in a counterclockwise direction a predetermined degree. The rod 58 is thereby moved to the left to release the master cylinder 49 for movement to the left by the action of the high pressure air in chamber 26 coacting with the spring 46 on the diaphragm 29. As set forth above, the spring 53a retains the plunger 53 in contact with the head 59, therefore, the rod 58, plunger 53 and cylinder 49 are moved simultaneously to the left. The stem 38 is thereby moved to the position shown in Fig. 2 to contact the valve head 37 and remove the valve 34 from the port 28. It is then readily seen that the high pressure air will again flow from the chamber 24 through the port 28, central chamber 25 and conduit 20 to the air actuator 13. The high pressure air in the actuator 13 will overcome the force exerted by the spring 17 and force the plunger 18 along with the slave plunger 73 to the left.

The slave plunger 73, in moving to the left, forces hydraulic fluid from the slave cylinder 72 through the conduit 70 into the outer end 69 of the chamber 52. Since the plunger 53 will then be in contact with the head 59, the hydraulic fluid being introduced into the outer end 69 of the chamber 52 will react on the cup-shaped member 51 to force the master cylinder 49 to the right, it being understood that the actuating handle 64 is held in a predetermined position by the operator to fix the position of the rod 58. The valve stem 38 is therefore also moved to the right to release the valve head 37 and permit movement of the valve 34 into closing position over the port 28. Further flow of high pressure fluid to the air actuator 13 is thereby prohibited. The air remaining in the actuator 13 will exert a sufficient force to equalize the force exerted by the spring 17, and retain the air actuating plunger 18 in a fixed position. Movement of the slave plunger 73 to the left will also therefore be stopped to preclude a further introduction of the hydraulic fluid into the outer end 69 of the chamber 52.

In this manner, the movement of the master cylinder 49 is stopped to position the valve stem 38 into contact with the valve head 37 in such a position that the valve 34 will be in a closed position over the port 28 and the sealing member 41 will be in closed position over the bore 43 of the stem 38. When the brake band 7 is in this partially released position, the plunger 53 will be positioned in an intermediate position in the chamber 52 in spaced relation to the shoulders 55 and 56.

Further movement of the actuating handle 64 in a counterclockwise direction will result in a similar addition of air pressure to the air actuator 13 to overcome operation of the spring 17 and completely release the brake band 7 from the drum 4. When the brake band 7 is completely released from the drum 4, the master plunger 53 will be in the position shown in Fig. 2, that is, in contact with the shoulder 56. Upon further movement of the handle 64 in a counterclockwise direction, the rod 58 is moved to the left through the plunger 53 to provide communication between the opposite ends of the chamber 52 through the aperture 57. In this condition, any surplus fluid in the hydraulic circuit (designated by the chamber 52 to the right of the plunger 53, the conduit 70 and slave cylinder 72) will be exhausted through aperture 57 into the end 67 of chamber 52 and reservoir 65. In the event of a deficiency of fluid in the hydraulic circuit, which may be due to leaks or fluid contraction, fluid will flow from the reservoir 65 and end 67 of chamber 52 through the aperture 57 to replenish the fluid in the circuit.

From the foregoing, it is apparent that the present invention provides a novel hydraulic control for a pneumatic braking apparatus wherein the position of the actuating handle predetermines the amount of braking action applied. "Hunting," that is, juggling or frequent moving of the actuating handle to obtain a desired braking action, is thereby dispensed with. When the operator positions the actuating handle a predetermined braking action is assured. It is also apparent that the present invention provides a novel hydraulic control system utilizing a stationary slave cylinder and a movable master cylinder. Furthermore, an efficient hydraulic control is provided, having a long service life, which may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with an air actuated cylinder for use with a brake band or the like, comprising an air operated plunger reciprocable in said cylinder, an air valve mechanism connected to the cylinder to control movement of the plunger, a control handle cooperating with the valve mechanism to cause actuation thereof, a diaphragm member disposed within the air valve mechanism and exposed to air pressure differentials therein, a movable stem extending through the diaphragm and adapted for movement therewith in one direction to open the valve for supplying air pressure to the air cylinder and in an opposite direction to close the valve for exhausting air pressure from the air cylinder, a hydraulic master cylinder carried by the stem and movable simultaneous therewith, a master plunger reciprocable in the master cylinder, a slave cylinder disposed in the air cylinder, a slave plunger reciprocably disposed in the slave cylinder and adapted to contact the air plunger, means interconnecting the master and slave cylinder providing hydraulic pressure therebetween, said master plunger manually moved to apply fluid pressure against the slave plunger for moving it in one direction against the air operated plunger to provide a fluid lock, said handle connected to the master plunger and adapted to be initially moved to cause movement of the valve stem for operation of the valve to alternately supply and exhaust air pressure from the air cylinder, and said handle responsive to the feel provided by the fluid lock and air pressure differentials acting upon the diaphragm to control movement of the valve stem and determine the amount of force applied by the air operated plunger.

2. The combination of an air cylinder, a plunger reciprocally disposed in said cylinder and adapted to be moved in one direction by air pressure, means constantly urging said plunger in an opposite direction, an air valve mechanism controlling application of air pressure to said cylinder to move said plunger in the first mentioned direction, a diaphragm member disposed within the valve and exposed to air pressure differentials, a cylindrical stem extending into the valve mechanism and through the diaphragm to be biased thereby for opening the valve to cause movement of the plunger in the first mentioned direction, said stem member controlling the operation of the valve and whereby the valve is alternately opened to supply air pressure to the air cylinder and closed to permit air pressure to exhaust from the cylinder, means constantly urging the stem toward a closed position for the valve, a hydraulic master cylinder carried by the stem, a slave cylinder hydraulically interconnected to the master cylinder, a slave plunger in the slave cylinder adapted to be moved in one direction by the first mentioned plunger and in the opposite direction by fluid pressure, a master plunger in the master cylinder manually moved to apply fluid pressure against the slave plunger for moving it in one direction against the air pressure in the air cylinder to provide a fluid lock, said master plunger adapted to move the stem to a position providing for the exhaust of air through the valve mechanism, whereby the first mentioned plunger is moved in said opposite direction to provide hydraulic movement of the slave plunger and a release of hydraulic fluid from the master cylinder in such a manner to release the stem for movement to a closed position, a handle for manually moving the master plunger and responsive to the feel provided by the fluid lock to control movement of the valve stem and determine the amount of force applied by the first mentioned plunger.

References Cited in the file of this patent

UNITED STATES PATENTS

| | | |
|---|---|---|
| 971,377 | Herr | Sept. 27, 1910 |
| 1,594,942 | Guernsey | Aug. 3, 1926 |
| 1,753,370 | Du Pont | Apr. 8, 1930 |
| 2,270,431 | Freeman | Jan. 20, 1942 |
| 2,308,299 | Page | Jan. 12, 1943 |
| 2,328,637 | Freeman | Sept. 7, 1943 |
| 2,342,878 | Majneri | Feb. 29, 1944 |
| 2,352,357 | Almond | June 27, 1944 |
| 2,589,850 | Orelind et al. | Mar. 18, 1952 |